(12) United States Patent
Langridge et al.

(10) Patent No.: US 8,917,240 B2
(45) Date of Patent: *Dec. 23, 2014

(54) VIRTUAL DESKTOP COORDINATE TRANSFORMATION

(71) Applicant: Microsoft Corporation, Redmond, WA (US)

(72) Inventors: Adam Jethro Langridge, Guildford (GB); David Addis, Guildford (GB)

(73) Assignee: Microsoft Corporation, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/931,499

(22) Filed: Jun. 28, 2013

(65) Prior Publication Data

US 2013/0285903 A1    Oct. 31, 2013

Related U.S. Application Data

(63) Continuation of application No. 12/475,882, filed on Jun. 1, 2009, now Pat. No. 8,487,871.

(51) Int. Cl.
*G06F 3/01* (2006.01)
*A63F 13/20* (2014.01)

(52) U.S. Cl.
CPC ............... *G06F 3/011* (2013.01); *G06F 3/017* (2013.01); *A63F 13/06* (2013.01); *A63F 2300/1087* (2013.01); *A63F 2300/6045* (2013.01); *A63F 2300/308* (2013.01)
USPC ............................. 345/157; 345/419; 715/848

(58) Field of Classification Search
CPC ....... G06F 3/011; G06F 3/017; G06F 3/0304; G06F 3/0425; G06F 3/04815; G06F 3/04842; A63F 2300/6045
USPC ................ 345/156–158, 419; 463/20, 31, 39; 715/848–850
See application file for complete search history.

(56) References Cited

U.S. PATENT DOCUMENTS 4,627,620 A    12/1986 Yang
4,630,910 A    12/1986 Ross et al.
(Continued)

FOREIGN PATENT DOCUMENTS

CN    1802668 A    7/2006
CN    101254344 B    6/2010
(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Regina Liang
(74) *Attorney, Agent, or Firm* — Gregg Wisdom; Judy Yee; Micky Minhas

(57) ABSTRACT

A computing system includes a depth image analysis module to track a world-space pose of a human in a fixed, world-space coordinate system. The computing system further includes an interaction module to establish a virtual interaction zone with an interface-space coordinate system that tracks the human. The computing system also includes a transformation module to transform a position defined in the fixed, world-space coordinate system to a position defined in the interface-space coordinate system.

20 Claims, 10 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,372,977 B2 | 5/2008 | Fujimura et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |

(56) References Cited

U.S. PATENT DOCUMENTS

| | | | |
|---|---|---|---|
| 7,683,954 B2 | 3/2010 | Ichikawa et al. | |
| 7,684,592 B2 | 3/2010 | Paul et al. | |
| 7,701,439 B2 | 4/2010 | Hillis et al. | |
| 7,702,130 B2 | 4/2010 | Im et al. | |
| 7,704,135 B2 | 4/2010 | Harrison, Jr. | |
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 8,487,871 B2 * | 7/2013 | Langridge et al. | 345/157 |
| 2002/0075334 A1 | 6/2002 | Yfantis | |
| 2003/0076293 A1 | 4/2003 | Mattsson | |
| 2004/0063481 A1 | 4/2004 | Wang | |
| 2006/0033701 A1 | 2/2006 | Wilson | |
| 2006/0148563 A1 | 7/2006 | Yang | |
| 2006/0209021 A1 | 9/2006 | Yoo et al. | |
| 2008/0026838 A1 | 1/2008 | Dunstan et al. | |
| 2008/0030460 A1 | 2/2008 | Hildreth et al. | |
| 2009/0027337 A1 | 1/2009 | Hildreth | |

FOREIGN PATENT DOCUMENTS

| | | |
|---|---|---|
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2008014826 A1 | 2/2008 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Bretzner, et al., "A Prototype System for Computer Vision Based Human Computer Interaction", Technical report ISRN KTH/NA/P-01/09-SE, Jun. 18, 1998, 15 pages.

O'Hagan et al., "A Robust and Real-Time Gesture Interface", AI '97 Proceedings of the 10th Australian Joint Conference on Artificial Intelligence: Advanced Topics in Artificial Intelligence, Nov. 1997, 10 pages.

IVIM Inc., "Nouse Perceptual Vision Interface", Retrieved at http://www.ivim.ca/Nouse/docs/ExecSummary.pdf, Jan. 2008, 22 pages.

"Computer Vision Based Human-Computer Interaction", retrieved at <<http://www.nada.kth.se/cvap/gvmdi/>>, May 14, 2009, 4 pages.

Aggarwal, et al., "Human motion: Modeling and recognition of actions and interactions." Proceedings of the 2nd International Symposium on 3D Data Processing, Visualization and Transmission, Sep. 2004, 8 pages.

Rauterberg, "From Gesture to Action: Natural User Interfaces", retrieved at <<http://www.idemployee.id.tue.hl/g.w.m.rauterberg/publications/Diesrede99.pdf>>, 1999, 11 pages.

Korean Intellectual Property Office, International Search Report and Written Opinion of PCT/US2012/036797, Jan. 26, 2011, 9 pages.

State Intellectual Property Office of China, Office Action of Chinese Patent Application No. 201080024894.8, Nov. 5, 2013, 12 pages.

The State Intellectual Property Office of the People's Republic of China, Second Office Action Issued in Chinese Patent Application Number. 201080024894.8, Jun. 10, 2014, 7 pages.

* cited by examiner

VIRTUAL DESKTOP COORDINATE TRANSFORMATION

CROSS-REFERENCE TO RELATED APPLICATIONS

This application is a continuation of U.S. patent application Ser. No. 12/475,882, filed Jun. 1, 2009, and titled "VIRTUAL DESKTOP COORDINATE TRANSFORMATION", the entire contents of which is hereby incorporated herein by reference for all purposes.

BACKGROUND

The desktop metaphor is widely used in an attempt to make computing systems more user-friendly. While the desktop metaphor has proven to be much easier to use than command line interfaces, some users remain frustrated by mice, trackballs, trackpads, and other input devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to some aspects of the present disclosure, a computing system is configured to provide a virtual desktop which may be manipulated using natural hand gestures. The computing system includes a depth image analysis module to track a world-space pose of a human in a fixed, world-space coordinate system. The computing system further includes an interaction module to establish a virtual interaction zone with an interface-space coordinate system that tracks the human. The computing system also includes a transformation module to transform a position defined in the fixed, world-space coordinate system to a position defined in the interface-space coordinate system.

DETAILED DESCRIPTION

The present disclosure is directed to a virtual desktop that a user can control using natural gestures (e.g., hand movements) without necessarily holding any motion-detecting controls (e.g., accelerometers, gyroscopes, etc.) or wearing any specific markers (e.g., retro-reflectors). In particular, a depth camera or other source for acquiring depth information is used to efficiently and accurately model and track a user. The position and orientation of the user in world space is used as a reference to establish an interaction zone having a position and orientation that tracks the user's position and orientation. The user can move his hands, or other body parts, within the interaction zone to control the position of virtual objects (e.g., cursors) in a virtual desktop.

Figure 1:
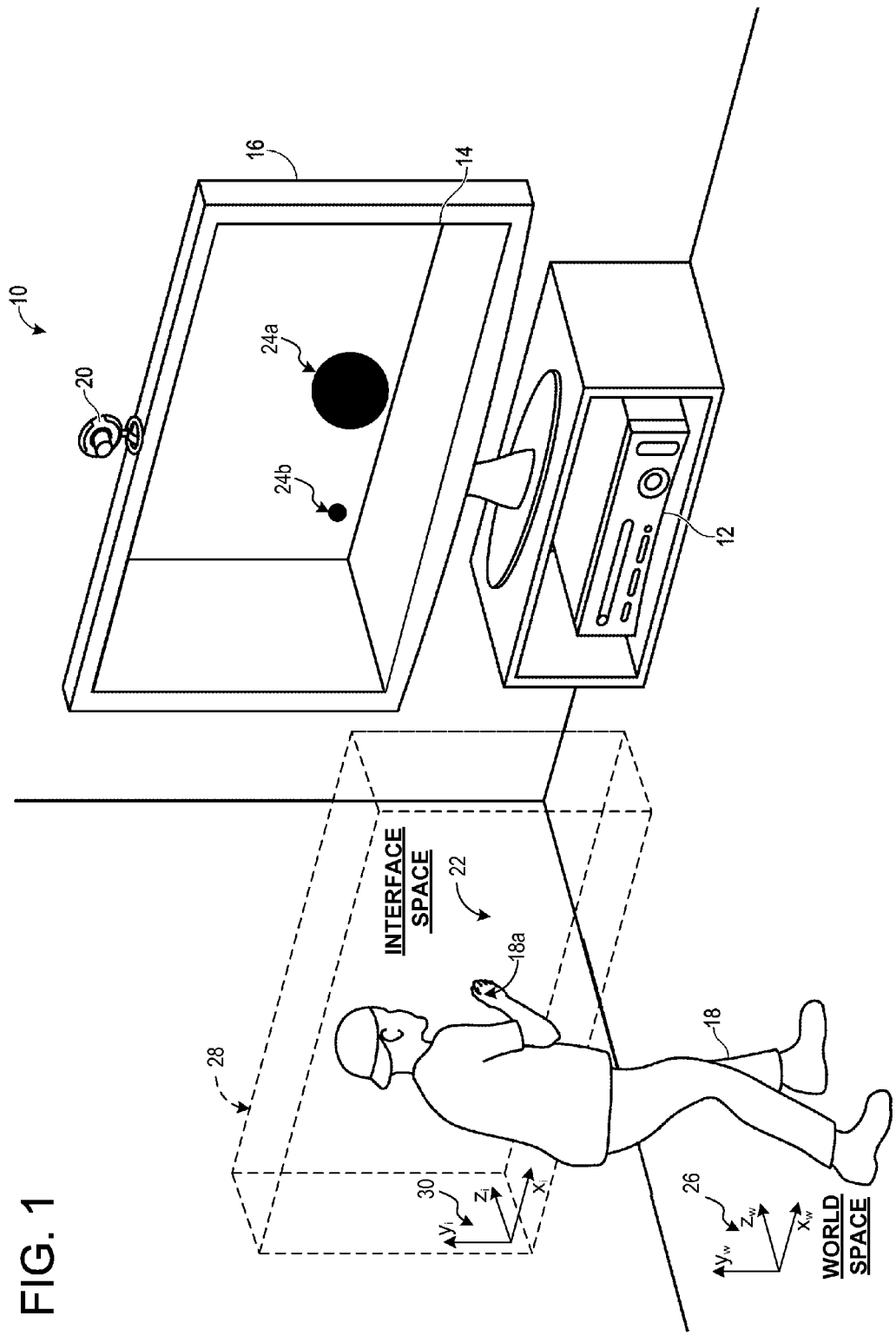
FIG. 1 schematically shows a human as the human makes gestures within a virtual interaction zone to control cursor positions of a virtual desktop displayed by a television monitor.

FIG. 1 shows a nonlimiting example of a target tracking system 10. In particular, FIG. 1 shows a computing system 12 that may be used to play a variety of different games, play one or more different media types, and/or control or manipulate non-game applications. FIG. 1 also shows a display 14 in the form of a high-definition television, or HDTV 16, which may be used to present visual information to users, such as user 18. Furthermore, FIG. 1 shows a capture device in the form of a depth camera 20, which may be used to visually monitor one or more users, such as user 18.

A target tracking system may be used to recognize, analyze, and/or track one or more targets, such as user 18. Target movements may be interpreted as operating system and/or application controls. Virtually any controllable aspect of an operating system and/or application may be controlled by movements of a target, such as user 18.

FIG. 1 shows a scenario in which user 18 is tracked using depth camera 20 so that the movements of user 18 may be interpreted by computing system 12 as controls that can be used to manipulate a virtual desktop being executed by computing system 12. In other words, user 18 may use his movements to control the virtual desktop. The computing system uses HDTV 16 to visually present a three-dimensional desktop environment 22 to user 18. Furthermore, the computing system uses HDTV 16 to visually present virtual cursor 24a and virtual cursor 24b, which user 18 controls with his movements. For example, the user's right hand 18a controls virtual cursor 24a and the user's left hand (occluded) controls virtual cursor 24b.

Computing system 12 and depth camera 20 can be used to recognize and analyze the movements of user 18 in a fixed, world space coordinate system 26. As explained in detail below, the user 18 can be represented by a machine-readable model in a model-space coordinate system that corresponds to the world-space coordinate system.

An interaction zone 28 can be conceptualized in world space and instantiated in model space. The interaction zone can be configured to move with the user as the user moves in world space. As such, the relationship between the fixed, world-space coordinate system 26 and a moveable, interface-space coordinate system 30 can change as the user moves in world space. As a consequence, a moveable, interface-space coordinate system of the instantiated interaction zone in model space may change relative to the fixed, model-space coordinate system.

A position of the user's hands, or other body parts, in the moveable, interface-space coordinate system may be used as the basis for determining a corresponding position (e.g., cursor position) in a desktop-space coordinate system of the virtual desktop. In other words, the absolute position of the hand in world space is not directly used to find a corresponding position of the virtual desktop. Instead, the position of the hand within the interaction zone, which tracks the user's movements in world space, is used to find a corresponding position of the virtual desktop. In this manner, a user can comfortably control a virtual desktop using the same movements and gestures, even as the user moves forward, backward, left, or right, and/or pivots left, right, up, or down.

Any given world space position may correspond to a variety of different virtual desktop positions depending on the position and orientation of the user in world space. Likewise, the same virtual desktop position can correspond to a variety of different world space positions depending on the position and orientation of the user in world space.

As described below with reference to FIG. 10, a variety of different types of target tracking systems may be used without departing from the spirit of this disclosure. The scenario described with reference to FIG. 1 is provided as an example, but is not meant to be limiting in any way. To the contrary, the illustrated scenario is intended to demonstrate a general concept, which may be applied to a variety of different applications without departing from the scope of this disclosure.

Figure 2:
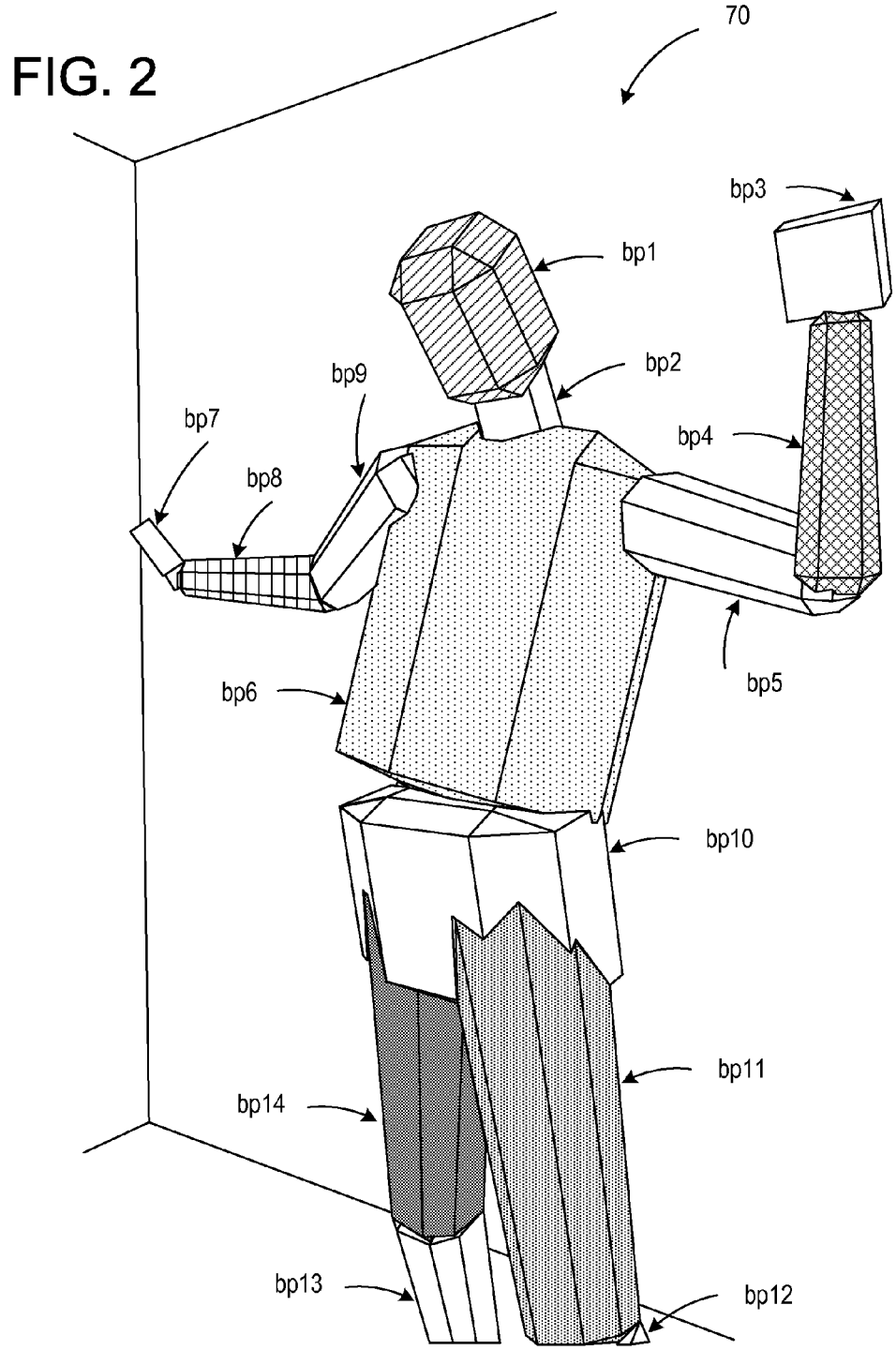
FIG. 2 shows an exemplary body model used to represent a human target.

As introduced above, a computer-readable model may be used to represent a human. FIG. 2 shows a nonlimiting visual representation of an example computer-readable model in the form of a body model 70. Body model 70 is a machine representation of a modeled target (e.g., user 18 from FIG. 1). The body model may include one or more data structures that include a set of variables that collectively define the modeled target in the language of a game or other application/operating system.

A model of a target can be variously configured without departing from the scope of this disclosure. In some examples, a model may include one or more data structures that represent a target as a three-dimensional model comprising rigid and/or deformable shapes, or body parts. Each body part may be characterized as a mathematical primitive, examples of which include, but are not limited to, spheres, anisotropically-scaled spheres, cylinders, anisotropic cylinders, smooth cylinders, boxes, beveled boxes, prisms, and the like.

For example, body model 70 of FIG. 2 includes body parts bp1 through bp14, each of which represents a different portion of the modeled target. Each body part is a three-dimensional shape. For example, bp3 is a rectangular prism that represents the left hand of a modeled target, and bp5 is an octagonal prism that represents the left upper-arm of the modeled target. Body model 70 is exemplary in that a body model may contain any number of body parts, each of which may be any machine-understandable representation of the corresponding part of the modeled target.

A model including two or more body parts may also include one or more joints. Each joint may allow one or more body parts to move relative to one or more other body parts. For example, a model representing a human target may include a plurality of rigid and/or deformable body parts, wherein some body parts may represent a corresponding anatomical body part of the human target. Further, each body part of the model may comprise one or more structural members (i.e., "bones"), with joints located at the intersection of adjacent bones. It is to be understood that some bones may correspond to anatomical bones in a human target and/or some bones may not have corresponding anatomical bones in the human target.

Figure 3:
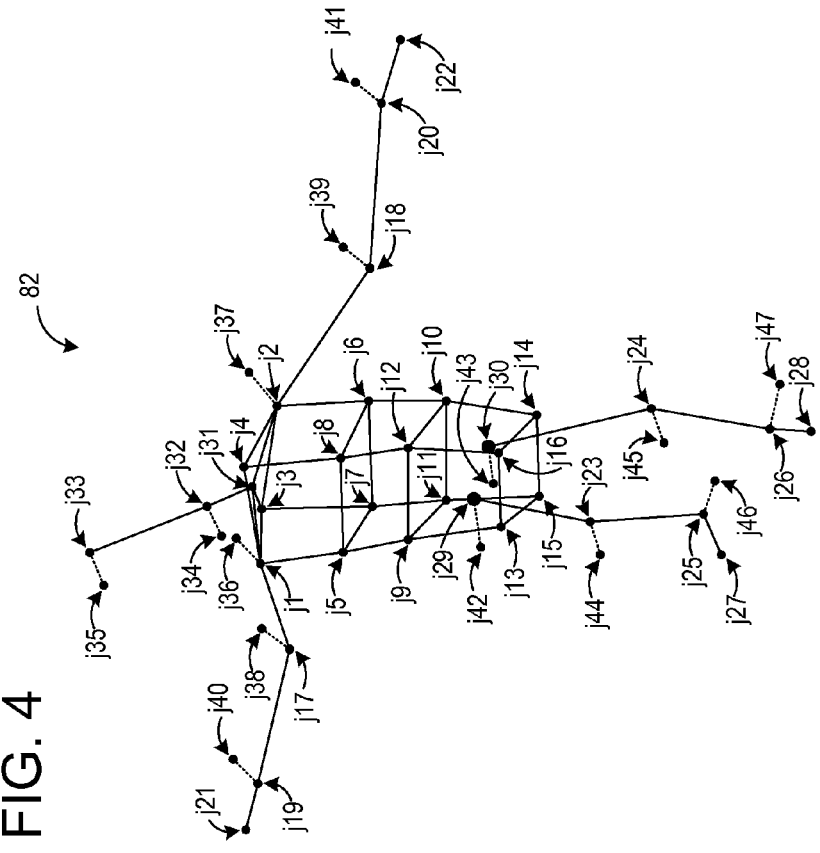
FIG. 3 shows a substantially frontal view of an exemplary skeletal model used to represent a human target.
Figure 4:
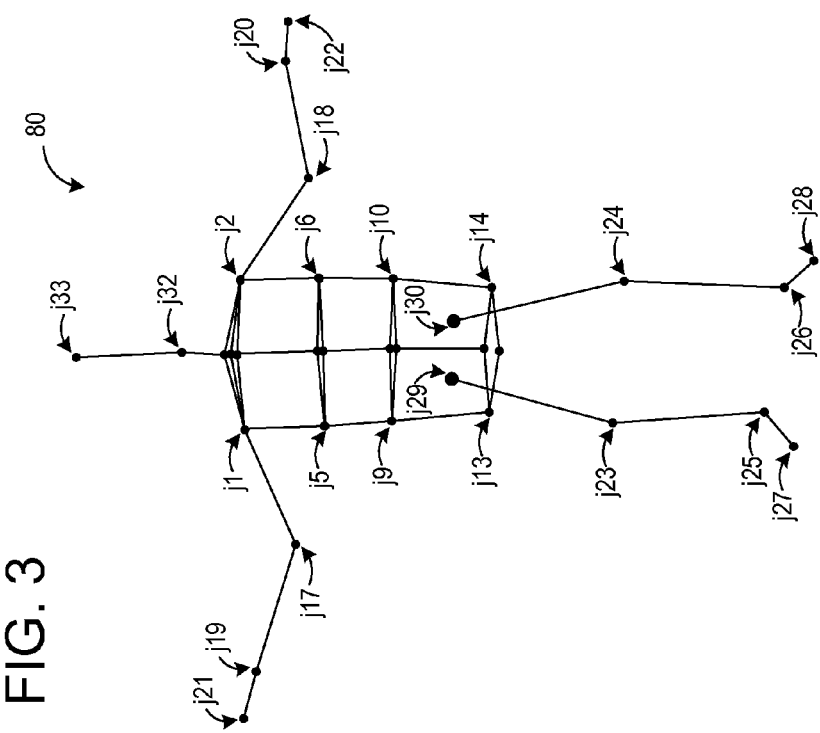
FIG. 4 shows a skewed view of an exemplary skeletal model used to represent a human target.

The bones and joints may collectively make up a skeletal model, which may be a constituent element of the model. The skeletal model may include one or more skeletal members for each body part and a joint between adjacent skeletal members. Exemplary skeletal model 80 and exemplary skeletal model 82 are shown in FIGS. 3 and 4, respectively. FIG. 3 shows a skeletal model 80 as viewed from the front, with joints j1 through j33. FIG. 4 shows a skeletal model 82 as viewed from a skewed view, also with joints j1 through j33. Skeletal model 82 further includes roll joints j34 through j47, where each roll joint may be utilized to track axial roll angles. For example, an axial roll angle may be used to define a rotational orientation of a limb relative to its parent limb and/or the torso. For example, if a skeletal model is illustrating an axial rotation of an arm, roll joint j40 may be used to indicate the direction the associated wrist is pointing (e.g., palm facing up). Thus, whereas joints can receive forces and adjust the skeletal model, as described below, roll joints may instead be constructed and utilized to track axial roll angles. More generally, by examining an orientation of a limb relative to its parent limb and/or the torso, an axial roll angle may be determined. For example, if examining a lower leg, the orientation of the lower leg relative to the associated upper leg and hips may be examined in order to determine an axial roll angle.

Figure 5:
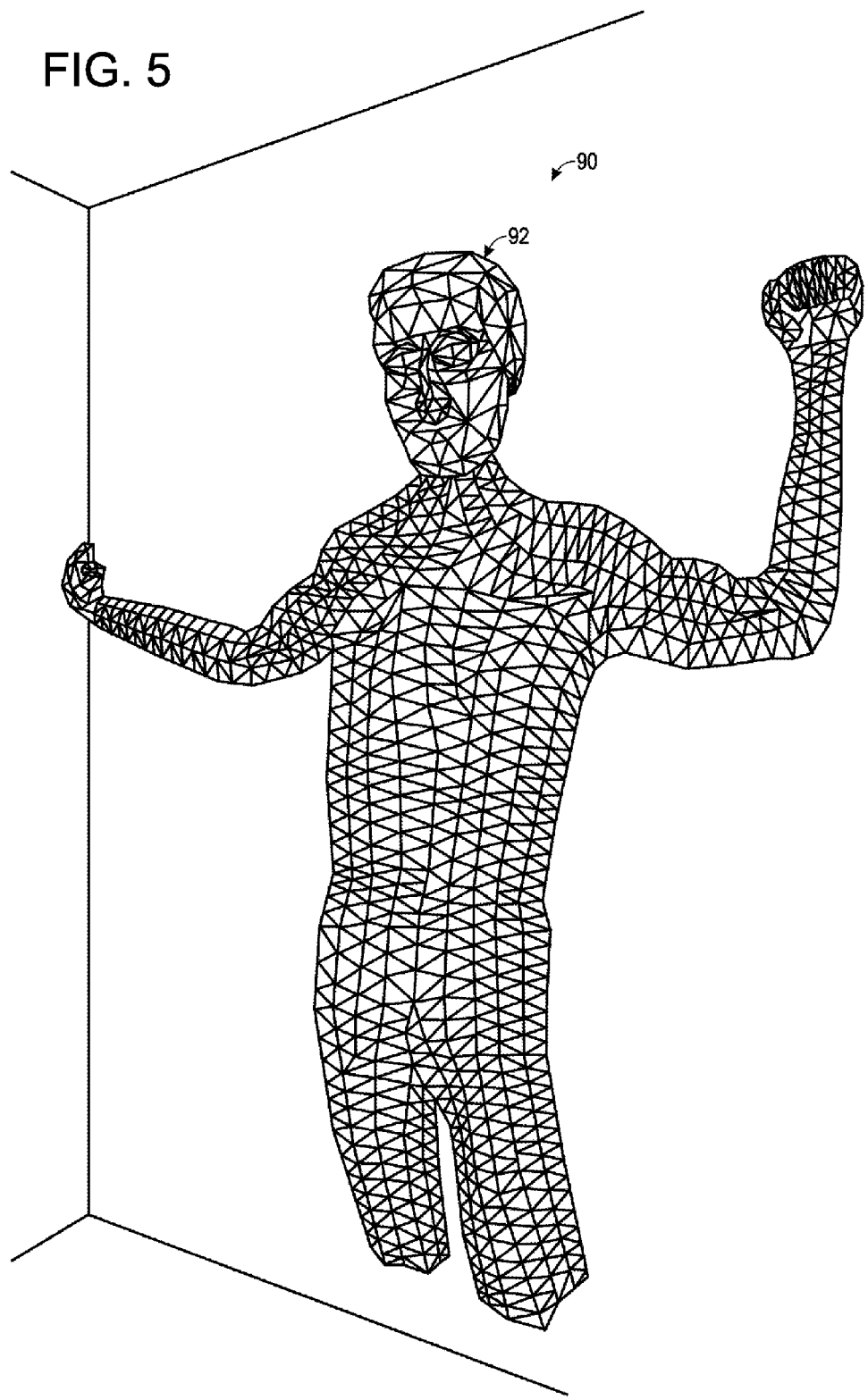
FIG. 5 shows an exemplary mesh model used to represent a human target.

As described above, some models may include a skeleton and/or body parts that serve as a machine representation of a modeled target. In some embodiments, a model may alternatively or additionally include a wireframe mesh, which may include hierarchies of rigid polygonal meshes, one or more deformable meshes, or any combination of the two. As a nonlimiting example, FIG. 5 shows a model 90 including a plurality of triangles (e.g., triangle 92) arranged in a mesh that defines the shape of the body model. Such a mesh may include bending limits at each polygonal edge. When a mesh is used, the number of triangles, and/or other polygons, that collectively constitute the mesh can be selected to achieve a desired balance between quality and computational expense. More triangles may provide higher quality and/or more accurate models, while fewer triangles may be less computationally demanding. A body model including a polygonal mesh need not include a skeleton, although it may in some embodiments.

The above described body part models, skeletal models, and polygonal meshes are nonlimiting example types of machine-readable models that may be used as machine representations of a modeled target. Other models are also within the scope of this disclosure. For example, some models may include patches, non-uniform rational B-splines, subdivision surfaces, or other high-order surfaces. A model may also include surface textures and/or other information to more accurately represent clothing, hair, and/or other aspects of a modeled target. A model may optionally include information pertaining to a current pose, one or more past poses, and/or model physics. It is to be understood that any model that can be posed is compatible with the herein described target recognition, analysis, and tracking.

As mentioned above, a model serves as a representation of a target, such as user 18 in FIG. 1. As the target moves in physical space, information from a capture device, such as depth camera 20 in FIG. 1, can be used to adjust a pose and/or the fundamental size/shape of the model so that it more accurately represents the target.

One example approach includes tracking a target by receiving an observed depth image of the target from a source and obtaining a posed model of the target. The posed model is rasterized into a synthesized depth image. The pose of the model is then adjusted based, at least in part, on differences between the observed depth image and the synthesized depth image. This approach may be referred to as model fitting.

Another example approach includes receiving an observed depth image of the target from a source and analyzing the observed depth image to determine the likely joint locations of the target as well as the relative confidence that such joint locations are accurate. This approach may be referred to as exemplar (i.e., it finds a pose by example). The exemplar method focuses on matching poses of a target (e.g., human) against a prior-trained collection of known poses.

It is to be understood that the herein disclosed methods of controlling a virtual desktop, including the conceptualization of an interaction zone and the coordinate transformations from the interaction zone to the virtual desktop, is compatible with model fitting, exemplar, or virtually any other technique for representing the pose of a human target with a corresponding pose of a machine-readable model.

Figure 6:
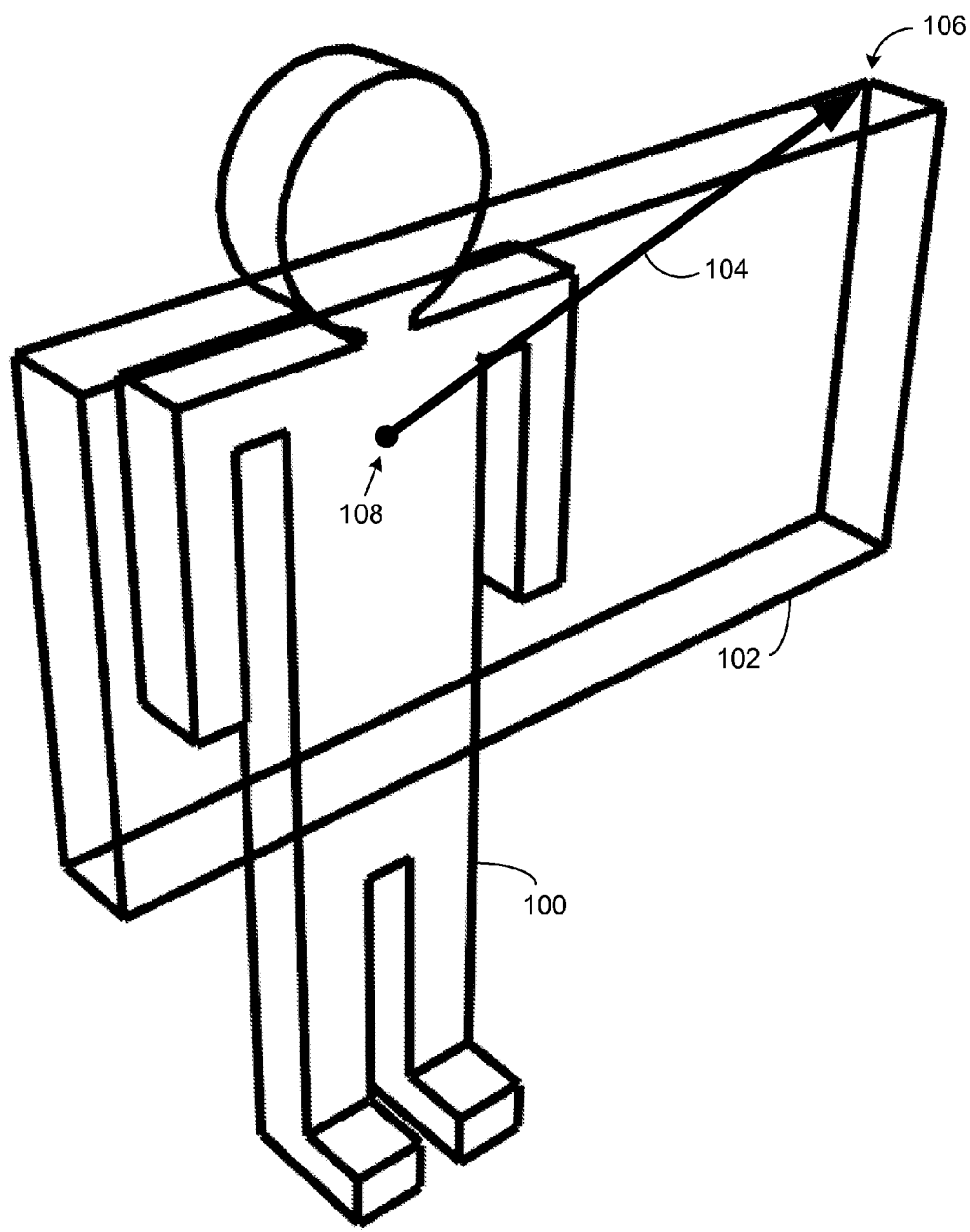
FIG. 6 schematically shows a positioning vector being used to position a virtual interaction zone relative to a model of a human target.

FIG. 6 schematically shows a model 100 in simplified form. As introduced above, an interaction zone 102 may be established with a position and orientation based on a position and orientation of the model 100. The position of the interaction zone 102 relative to the model 100 may be described by a one or more vectors. For example, a vector 104 of a fixed length may extend in a fixed direction away from the model to a top left, near corner 106 of the interaction zone. Depending on the type of model used to represent the human, such a vector may extend from a variety of different locations on the model, using a variety of different aiming guides. As one nonlimiting example, a model may have a chest segment 108 (e.g., polygon, surface, etc.), in which case the vector may extend from a center of the chest segment at a fixed angle up and to the left. In other embodiments, the interaction zone may be established with reference to one or more model joints. In some embodiments, the model may be constructed with invisible segments (e.g., bones) used to position the interaction zone. It is to be understood that any suitable technique can be used for positioning the interaction zone relative to the model without departing from the spirit of this disclosure. Furthermore, it is to be understood that by positioning the interaction zone relative to the model in model space, an interaction zone is conceptualized in front of the human in world space, as the model provides a scaled representation of the human as the human moves and/or changes poses in world space.

Figure 7:
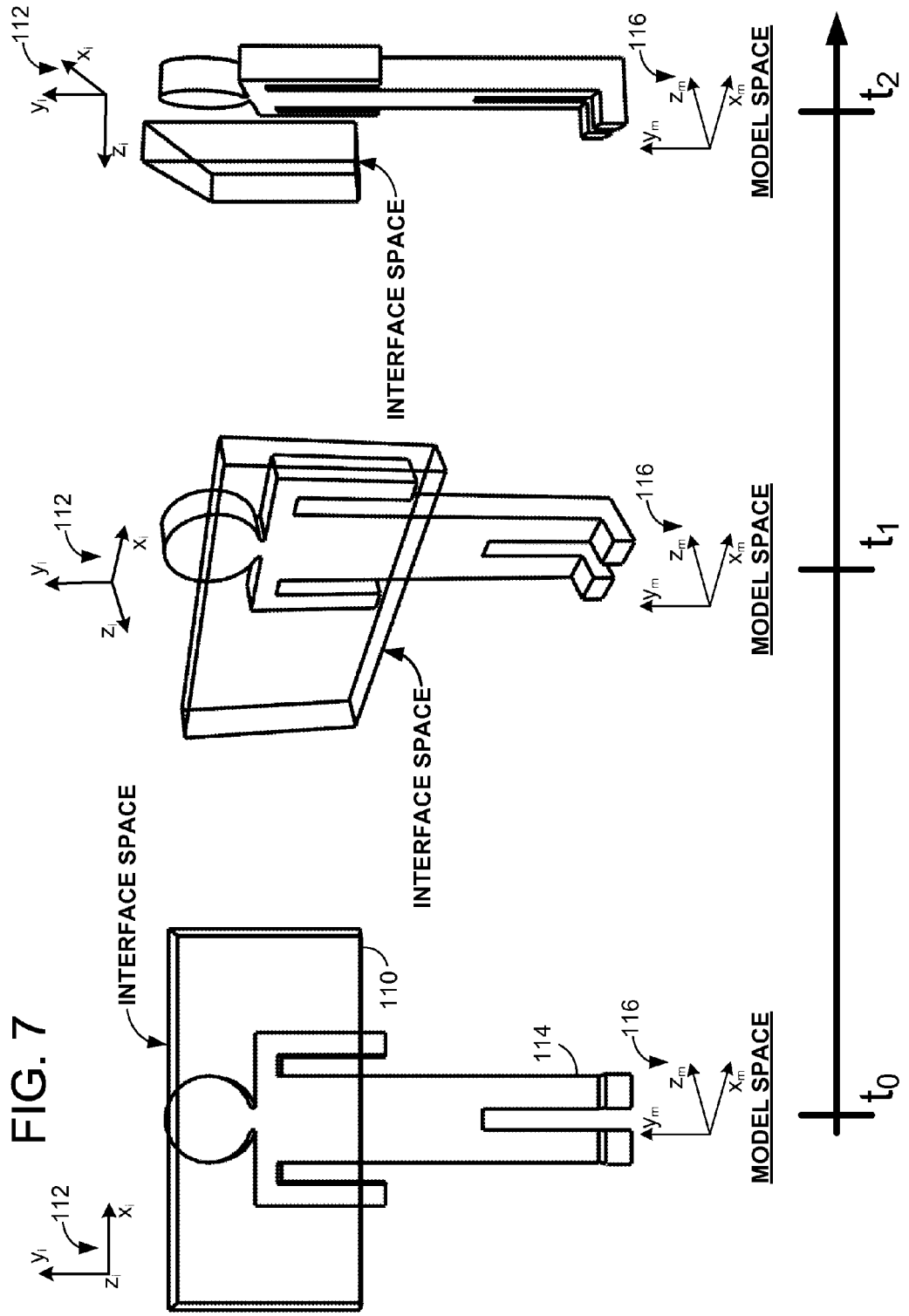
FIG. 7 schematically shows an interface-space coordinate system moving relative to a model-space/world-space coordinate system responsive to the human changing orientations in world space.

FIG. 7 shows an interaction zone 110 with a moveable, interface-space coordinate system 112 tracking a model 114 and moving relative to a fixed, model-space coordinate system 116. Because the interface space tracks the user, the interface space remains directly in front of the user, or in whatever other spatial relationship is established. The user can move around and/or change orientations in world space, and the interaction zone will automatically track the user. It is to be understood that the user may selectively adjust the relative position of the interaction zone (e.g., raise, lower, tilt, etc.) in some embodiments.

Figure 8:
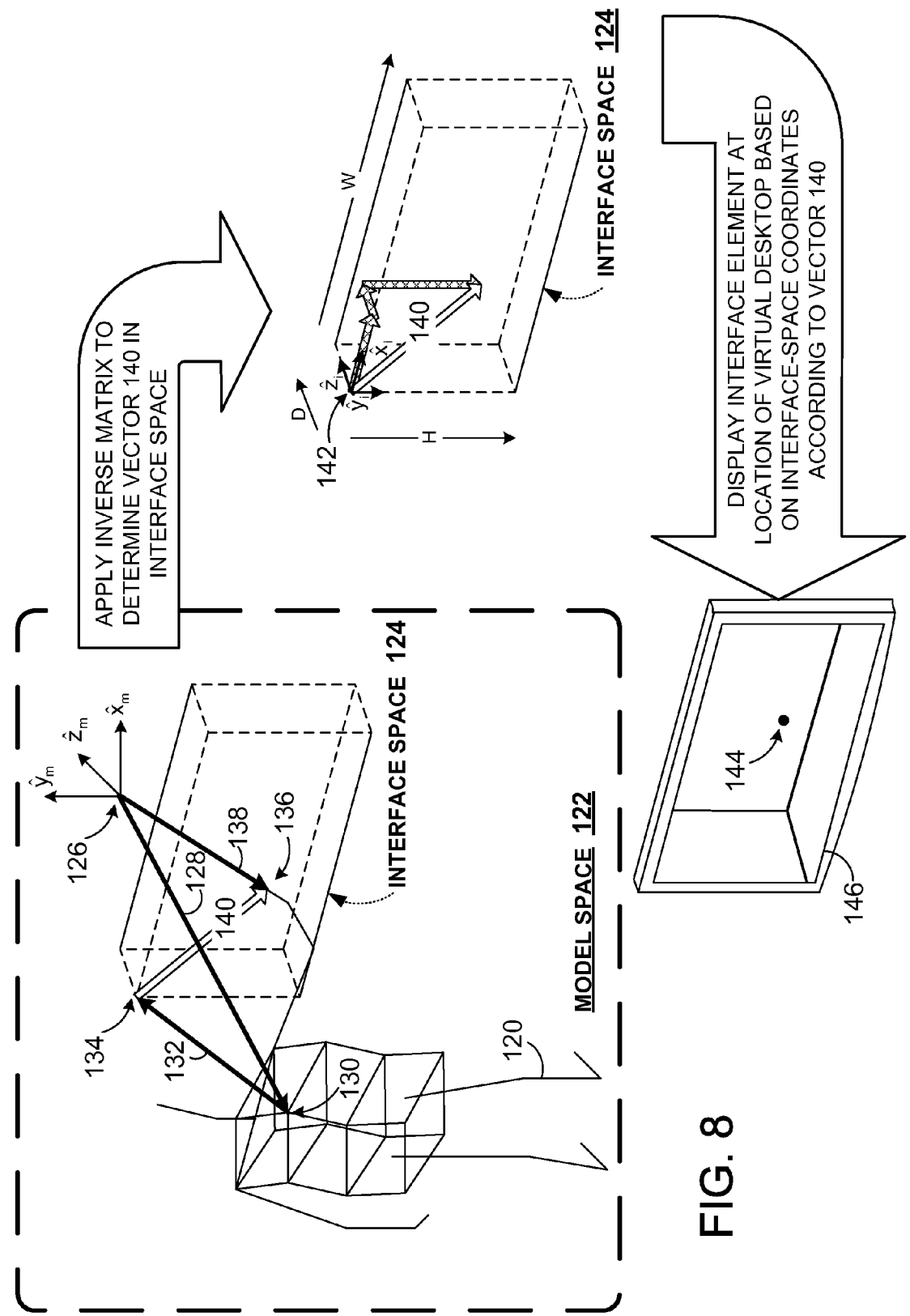
FIG. 8 schematically shows transformation of a hand position from model-space/world-space coordinates to interface-space/desktop-space coordinates.

FIG. 8 schematically depicts an approach for obtaining an interface-space position of a portion of the user in an interaction zone (i.e., obtain the interface-space coordinates of that portion of the user). The user with an outreached hand in an interaction zone may be modeled by a model 120 in model space 122, where model space 122 has its own coordinate system, namely a model-space coordinate system, defined by orthogonal vectors $\hat{x}_m, \hat{y}_m, \hat{z}_m$.

The model-space coordinate system is based on the world-space coordinate system in which the human and the depth camera exist—that is, model 120 represents the human as accurately as possible and the model space 122 represents the world space as accurately as possible. As such, calculations made with respect to the model in model space are operatively equivalent to corresponding calculations made to the human in world space.

As depicted, model 120 has an outreached hand in an interaction zone, where the interaction zone may be modeled in an interface space 124 having its own coordinate system, namely an interface-space coordinate system, defined by orthogonal vectors $\hat{x}_i, \hat{y}_i, \hat{z}_i$ in the illustrated embodiment. While the model-space coordinate system and the interface-space coordinate system are described as being Cartesian coordinate systems, it is to be understood that any other suitable coordinate system may be used without departing from the spirit of this disclosure. Different coordinate systems may be useful when the interaction zone does not have the shape of a cuboid. For example, a polar coordinate system may be useful if the interaction zone has the shape of one or more segments of a spherical shell.

The position and orientation of model 120 may be determined based on depth images of the user obtained by a depth camera, as described above. Thus, the depth camera may establish an origin for the model-space coordinate system, as shown at $\text{origin}_m$ 126.

In the model space frame of reference established by the model-space coordinate system, model vector 128 denotes the vector from $\text{origin}_m$ 126 extending to a reference point 130 on model 120, where the reference point 130 provides a basis for establishing a position of the interaction zone relative to the model, as described above with reference to FIG. 6. As depicted in FIG. 8, reference point 130 may be a point on the chest of model 120, however, as described above, it is to be understood that this is a nonlimiting example and another suitable location on model 120 may be used.

As further shown, an interaction zone vector 132 denotes a location of the interaction zone relative to model 120. In other words, interaction zone vector 132 denotes the vector from reference point 130 to an interaction zone location 134 of the interaction zone. As depicted, interaction zone location 134 is a top left corner of the interaction zone, however, any other location of the interaction zone may be used. As further shown in FIG. 8, a hand of model 120 extends into the interaction zone, to a point of interest, namely hand location 136. Accordingly, hand vector 138 denotes the vector from $\text{origin}_m$ 126 to hand location 136. The term selector point may be used to refer to the position of the hand, or any other body part, that is to be tracked within the interaction zone.

Hand location 136 is a "point of interest" in that this location represents a user interacting within a virtual user interface, and therefore the location of the hand may be used to direct an interface element (e.g., a cursor) displayed on the screen. In some embodiments, predetermined body parts (e.g., hands) are tracked in the interaction zone and used to control interface elements. Further, while the depth camera can determine hand location 136 in the world/space or model-space coordinate system, hand location 136 may be transformed to the interface space frame of reference of the interaction zone so that the position of the hand within the interaction zone may be used to control an interface element, or for any other suitable reason.

Accordingly, based on the position and orientation information of the aforementioned vectors, an inverse matrix may be applied to determine an interface space hand vector 140 indicating a position of the hand of model 120 relative to the interface space frame of reference. This approach is described in more detail as follows.

The interface-space coordinate system may have any suitable origin within the interface space 124. As an example, FIG. 8 depicts an origin, 142 at the top left corner of the interaction zone, at a same location as interaction zone location 134. Accordingly, interface space hand vector 140 may be a vector extending from origin, 142 to the location of the hand. In the interface-space coordinate system, interface space hand vector 140 may then be represented via components in each of the interface-space coordinate directions, as indicated by the patterned arrows. It is noted that interface space hand vector 140 is defined such that each component may have a magnitude between 0 and 1. Accordingly, the physical dimensions are then taken into account within the inverse transformation matrix via multiplicative factors defining a size of the interaction zone (i.e., height, width and depth).

Using the information provided by hand vector 138 and model vector 128, each represented in the model-space coordinate system, interface space hand vector 140 may be computed in the interface-space coordinate system as follows, interface space hand vector=(hand vector−model vector)$T^{-1}$.

Here, $T^{-1}$ denotes a transformation matrix from the model-space coordinate system to the interface-space coordinate system, and includes information for positioning the interaction zone relative to the model, namely interaction zone vector 132.

Accordingly, the matrix T denotes an opposite transformation, namely the transformation from the interface-space coordinate system to the model-space coordinate system, (interface space hand vector)$T$+model vector=hand vector.

For the purpose of illustration, formation of matrix T is described in more detail as follows, wherein upon forming matrix T, the inverse of matrix T may then be calculated to obtain $T^{-1}$.

Taking the interface-space coordinate system to be defined by unit vectors $\hat{x}_i, \hat{y}_i, \hat{z}_i$ and taking the model-space coordinate system to be defined by unit vectors $\hat{x}_m, \hat{y}_m, \hat{z}_m$ the interface-space unit vectors may be described in the model-space coordinate system as follows:

$\hat{x}_i = x_x \hat{x}_m + x_y \hat{y}_m + x_z \hat{z}_m$ $\hat{y}_i = y_x \hat{x}_m + y_y \hat{y}_m + y_z \hat{z}_m$ $\hat{z}_i = z_x \hat{x}_m + z_y \hat{y}_m + z_z \hat{z}_m$ where coefficients of the model-space unit vectors, namely coefficients $x_x$, $y_x$, etc., are scalar values. Such values are known, since the position and orientation of the interaction zone is known in the model-space coordinate system.

Interaction zone vector 132 may be represented in the model-space coordinate system as, $\vec{V}_m = v_x \hat{x}_m + v_y \hat{y}_m + v_z \hat{z}_m$.

Again, coefficients $v_x$, $v_y$ and $v_z$ are scalar values, and are known since the position and orientation of the interaction zone is known in the model-space coordinate system.

Taking dimensions of the interaction zone to be a height H in the $\hat{y}_i$ direction, a width W in the $\hat{x}_i$ and a depth D in the $\hat{z}_i$ direction, as shown in FIG. 8, the transformation matrix T may be written as follows, $$T = \begin{pmatrix} x_x W & x_y W & x_z W & 0 \\ y_x H & y_y H & y_z H & 0 \\ z_x D & z_y D & z_z D & 0 \\ v_x & v_y & v_z & 1 \end{pmatrix}$$

Again, values H, W, D are known because the size of the interaction zone is known. Thus, all entries within matrix T may be calculated. Accordingly, the inverse of T may also be calculated to determine $T^{-1}$. Upon doing so, the interface space hand vector 140 may then be calculated via the following equation, interface space hand vector=(hand vector−model vector)$T^{-1}$, where hand vector 138 and model vector 128 are represented in the model-space coordinate system, and the calculated interface space hand vector 140 will be represented in the interface-space coordinate system.

Lastly, as further shown in FIG. 8, upon obtaining interface space hand vector 140 in the interface-space coordinate system, an interface element 144 may then be displayed by display 146 in a position defined by interface space hand vector 140. The interface-space coordinate system can be established to mimic, with or without scaling, a desktop-space coordinate system of the virtual desktop that is displayed.

While the above description uses a transformation from a Cartesian model-space coordinate system to a Cartesian interface-space coordinate system, it is to be understood that the same principles may be used to transform from virtually any coordinate system to virtually any other coordinate system. For example, FIG. 9 somewhat schematically shows an interaction zone 150 that is at least partially defined by two intersecting segments of spherical shells, each segment spatially centered about a shoulder of the human. An interaction zone with a curved space such as this may offer a user more precise control. Curved interaction zones may be centered about a user's shoulder, elbow, or virtually any point in space around the user. The illustrated example is not limiting, but rather shows that virtually any variation is within the spirit of this disclosure. When each arm of the user has its own interaction zone, a separate transformation matrix may be used to convert the hand position for that arm from world-space/model-space coordinates to interface-space coordinates.

Figure 9:
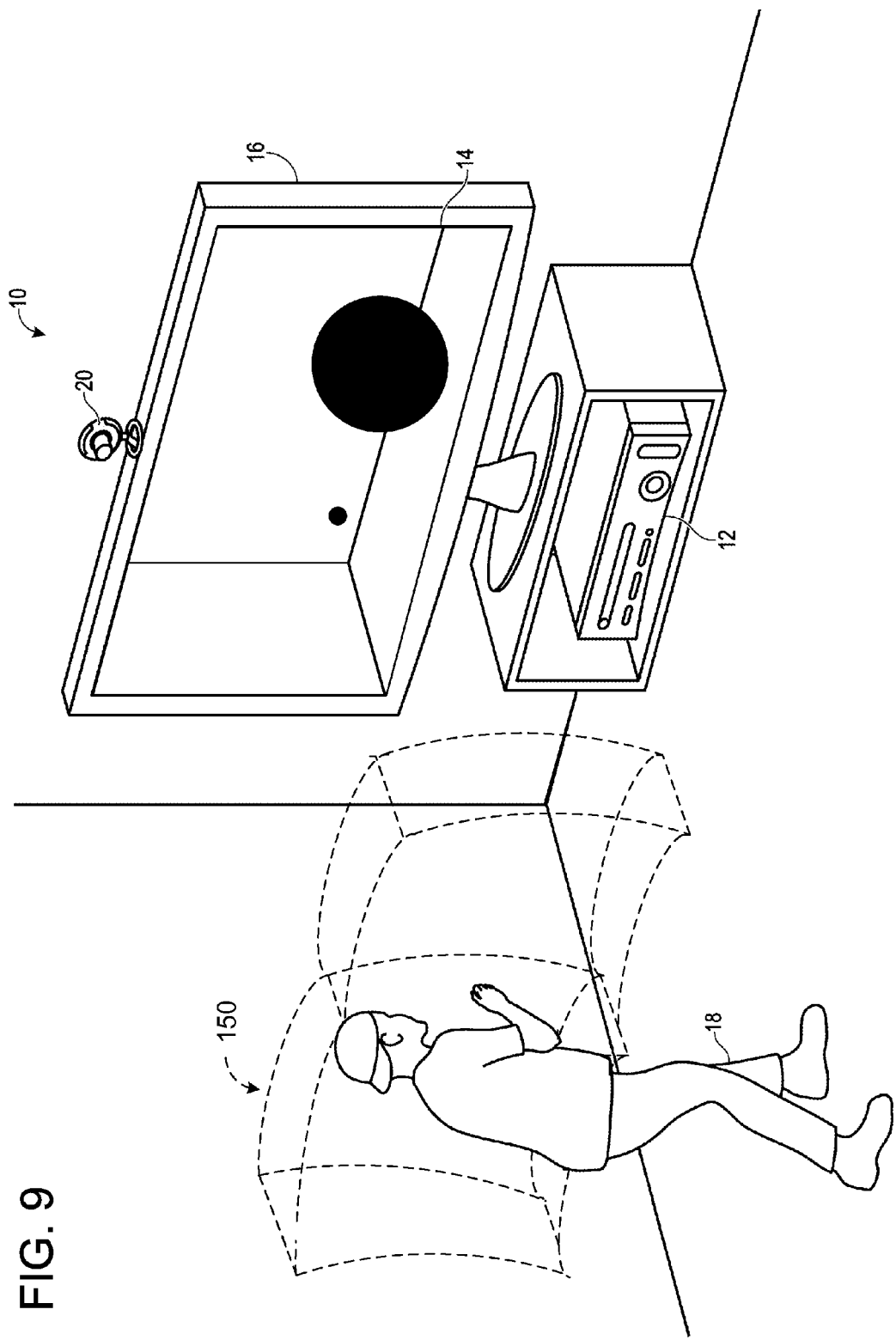
FIG. 9 schematically shows a human as the human makes gestures within another virtual interaction zone to control cursor positions of a virtual desktop displayed by a television monitor.

The methods and processes described herein may be tied to a variety of different types of computing systems. FIGS. 1 and 9 show a nonlimiting example in the form of computing system 12, HDTV 16, and depth camera 20. As another, more general, example, FIG. 10 schematically shows a computing system 160 that may perform one or more of the target recognition, tracking, and analysis methods and processes described herein. Computing system 160 may take a variety of different forms, including, but not limited to, gaming consoles, personal computing systems, military tracking and/or targeting systems, and character acquisition systems offering green-screen or motion-capture functionality, among others.

Computing system 160 may include a logic subsystem 162, a data-holding subsystem 164, a display subsystem 166, and/or a capture device 168. The computing system may optionally include components not shown in FIG. 10, and/or some components shown in FIG. 10 may be peripheral components that are not integrated into the computing system.

Logic subsystem 162 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 164 may include one or more physical devices configured to hold data and/or instructions executable by the logic subsystem to implement the herein described methods and processes. When such methods and processes are implemented, the state of data-holding subsystem 164 may be transformed (e.g., to hold different data). Data-holding subsystem 164 may include removable media and/or built-in devices. Data-holding subsystem 164 may include optical memory devices, semiconductor memory devices (e.g., RAM, EEPROM, flash, etc.), and/or magnetic memory devices, among others. Data-holding subsystem 164 may include devices with one or more of the following characteristics: volatile, nonvolatile, dynamic, static, read/write, read-only, random access, sequential access, location addressable, file addressable, and content addressable. In some embodiments, logic subsystem 162 and data-holding subsystem 164 may be integrated into one or more common devices, such as an application specific integrated circuit or a system on a chip.

Figure 10:
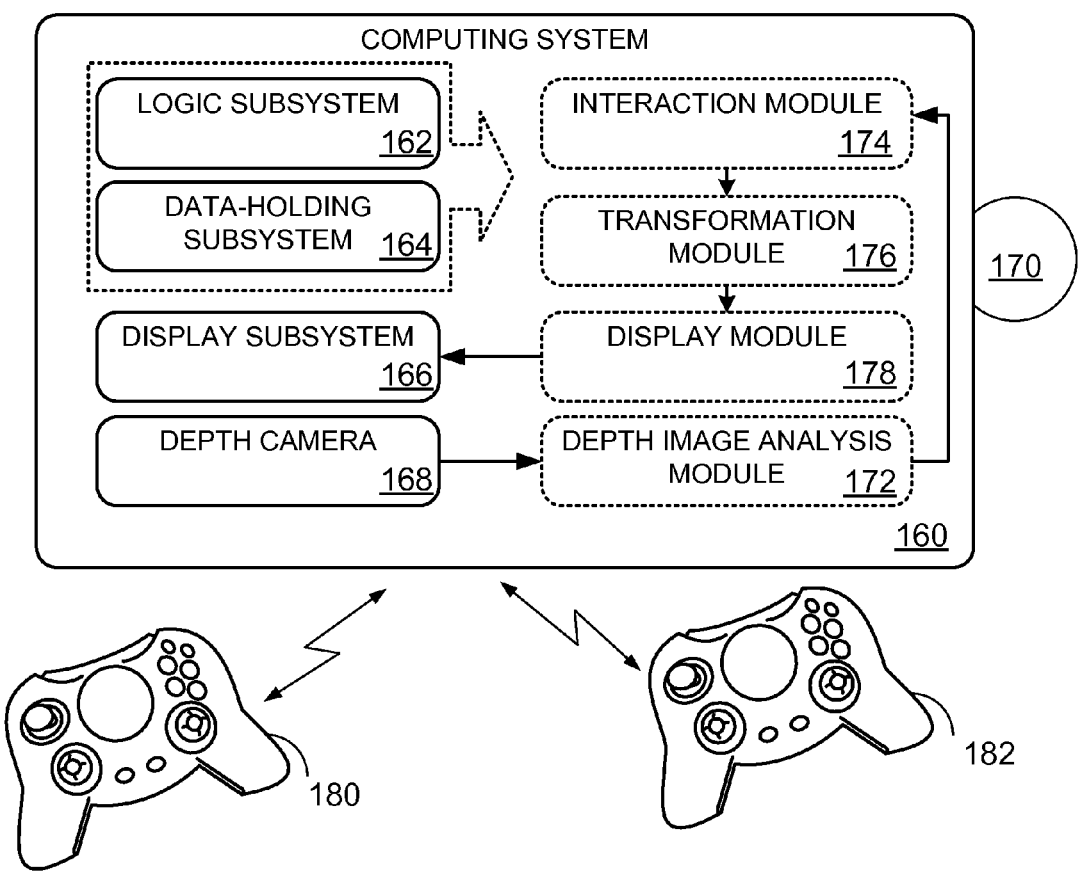
FIG. 10 schematically shows a computing system in accordance with an embodiment of the present disclosure.

FIG. 10 also shows an aspect of the data-holding subsystem in the form of computer-readable removable media 170, which may be used to store and/or transfer data and/or instructions executable to implement the herein described methods and processes.

The term "module" may be used to describe an aspect of computing system 160 that is implemented to perform one or more particular functions. In some cases, such a module may be instantiated via logic subsystem 162 executing instructions held by data-holding subsystem 164. It is to be understood that different modules and/or engines may be instantiated from the same application, code block, object, routine, and/or function. Likewise, the same module and/or engine may be instantiated by different applications, code blocks, objects, routines, and/or functions in some cases.

Computing system 160 includes a depth image analysis module 172 configured to track a world-space pose of a human in a fixed, world-space coordinate system, as described herein. The term "pose" refers to the human's position, orientation, body arrangement, etc. Computing system 160 includes an interaction module 174 configured to establish a virtual interaction zone with a moveable, interface-space coordinate system that tracks the human and moves relative to the fixed, world-space coordinate system, as described herein. Computing system 160 includes a transformation module 176 configured to transform a position defined in the fixed, world-space coordinate system to a position defined in the moveable, interface-space coordinate system as described herein. Computing system 160 also includes a display module 178 configured to output a display signal for displaying an interface element at a desktop-space coordinate corresponding to the position defined in the moveable, interface-space coordinate system.

Display subsystem 166 may be used to present a visual representation of data held by data-holding subsystem 164. As the herein described methods and processes change the data held by the data-holding subsystem, and thus transform the state of the data-holding subsystem, the state of display subsystem 166 may likewise be transformed to visually represent changes in the underlying data. As a nonlimiting example, the target recognition, tracking, and analysis described herein may be reflected via display subsystem 166 in the form of interface elements (e.g., cursors) that change position in a virtual desktop responsive to the movements of a user in physical space. Display subsystem 166 may include one or more display devices utilizing virtually any type of technology. Such display devices may be combined with logic subsystem 162 and/or data-holding subsystem 164 in a shared enclosure, or such display devices may be peripheral display devices, as shown in FIGS. 1 and 9.

Computing system 160 further includes a capture device 168 configured to obtain depth images of one or more targets. Capture device 168 may be configured to capture video with depth information via any suitable technique (e.g., time-of-flight, structured light, stereo image, etc.). As such, capture device 168 may include a depth camera, a video camera, stereo cameras, and/or other suitable capture devices.

For example, in time-of-flight analysis, the capture device 168 may emit infrared light to the target and may then use sensors to detect the backscattered light from the surface of the target. In some cases, pulsed infrared light may be used, wherein the time between an outgoing light pulse and a corresponding incoming light pulse may be measured and used to determine a physical distance from the capture device to a particular location on the target. In some cases, the phase of the outgoing light wave may be compared to the phase of the incoming light wave to determine a phase shift, and the phase shift may be used to determine a physical distance from the capture device to a particular location on the target.

In another example, time-of-flight analysis may be used to indirectly determine a physical distance from the capture device to a particular location on the target by analyzing the intensity of the reflected beam of light over time via a technique such as shuttered light pulse imaging.

In another example, structured light analysis may be utilized by capture device 168 to capture depth information. In such an analysis, patterned light (i.e., light displayed as a known pattern such as a grid pattern or a stripe pattern) may be projected onto the target. On the surface of the target, the pattern may become deformed, and this deformation of the pattern may be studied to determine a physical distance from the capture device to a particular location on the target.

In another example, the capture device may include two or more physically separated cameras that view a target from different angles, to obtain visual stereo data. In such cases, the visual stereo data may be resolved to generate a depth image.

In other embodiments, capture device 168 may utilize other technologies to measure and/or calculate depth values. Additionally, capture device 168 may organize the calculated depth information into "Z layers," i.e., layers perpendicular to a Z axis extending from the depth camera along its line of sight to the viewer.

In some embodiments, two or more different cameras may be incorporated into an integrated capture device. For example, a depth camera and a video camera (e.g., RGB video camera) may be incorporated into a common capture device. In some embodiments, two or more separate capture devices may be cooperatively used. For example, a depth camera and a separate video camera may be used. When a video camera is used, it may be used to provide target tracking data, confirmation data for error correction of target tracking, image capture, face recognition, high-precision tracking of fingers (or other small features), light sensing, and/or other functions.

It is to be understood that at least some target analysis and tracking operations may be executed by a logic machine of one or more capture devices. A capture device may include one or more onboard processing units configured to perform one or more target analysis and/or tracking functions. A capture device may include firmware to facilitate updating such onboard processing logic.

Computing system 160 may optionally include one or more input devices, such as controller 180 and controller 182. Input devices may be used to control operation of the computing system. In the context of a game, input devices, such as controller 180 and/or controller 182 can be used to control aspects of a game not controlled via the target recognition, tracking, and analysis methods and procedures described herein. In some embodiments, input devices such as controller 180 and/or controller 182 may include one or more of accelerometers, gyroscopes, infrared target/sensor systems, etc., which may be used to measure movement of the controllers in physical space. In some embodiments, the computing system may optionally include and/or utilize input gloves, keyboards, mice, track pads, trackballs, touch screens, buttons, switches, dials, and/or other input devices. As will be appreciated, target recognition, tracking, and analysis may be used to control or augment aspects of a game, or other application, conventionally controlled by an input device, such as a game controller. In some embodiments, the target tracking described herein can be used as a complete replacement to other forms of user input, while in other embodiments such target tracking can be used to complement one or more other forms of user input.

Figure 11:
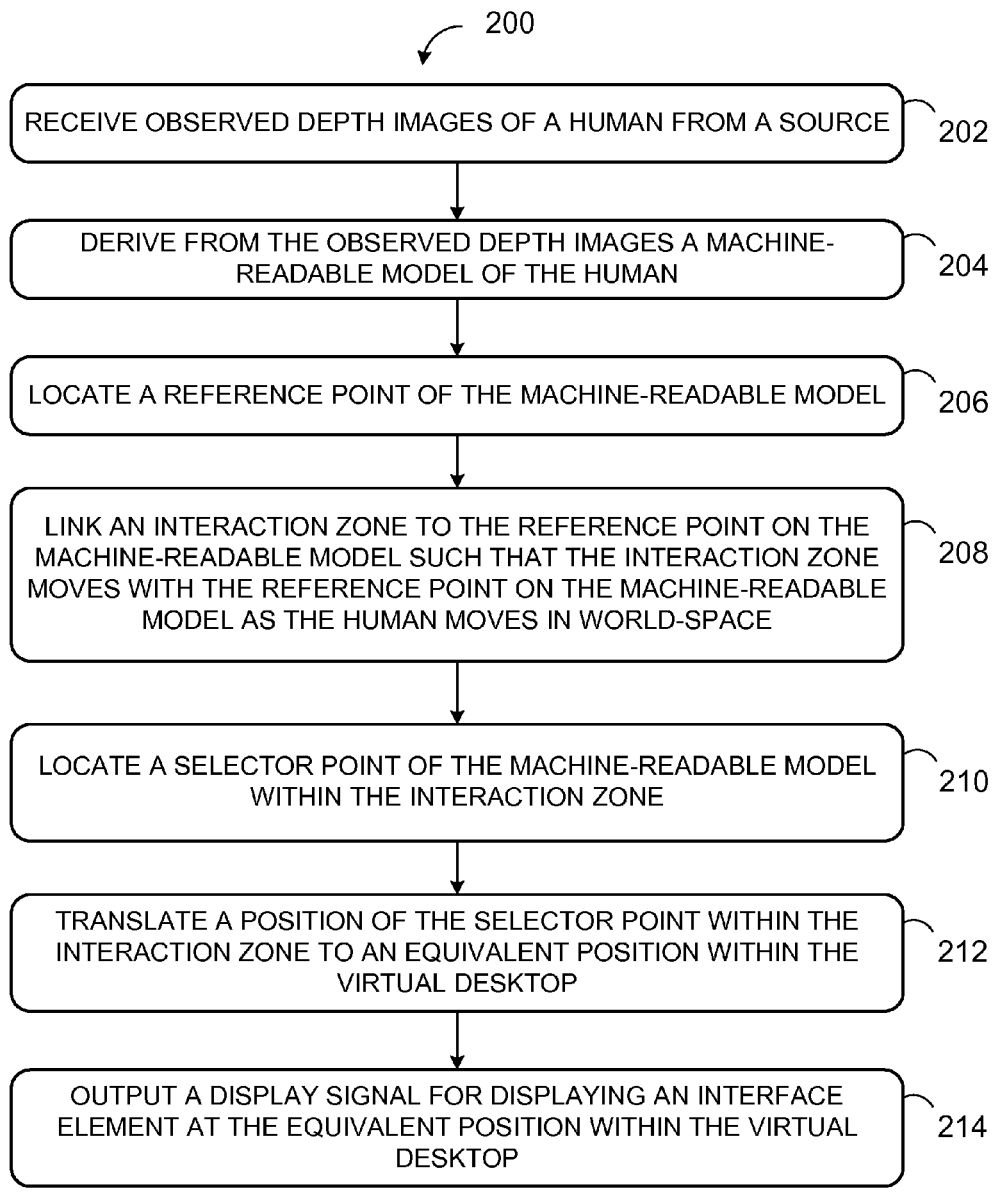
FIG. 11 shows a method of providing a virtual desktop.

FIG. 11 shows an example method 200 of providing a virtual desktop in accordance with the present disclosure. At 202, method 200 includes receiving observed depth images of a human from a source. At 204, method 200 includes deriving from the observed depth images a machine-readable model of the human, where the machine-readable model represents the human as the human moves in world-space. At 206, method 200 includes locating a reference point of the machine-readable model. At 208, method 200 includes linking an interaction zone to the reference point on the machine-readable model such that the interaction zone moves with the reference point on the machine-readable model as the human moves in world-space. At 210, method 200 includes locating a selector point of the machine-readable model within the interaction zone. At 212, method 200 includes translating a position of the selector point within the interaction zone to an equivalent position within the virtual desktop. As used herein, the term "equivalent" allows for linear and/or nonlinear scaling, shape transformations, or other variations resulting in the mathematical transformations described above. In this way, a position of a portion of the machine-readable model within the interaction zone can be identified. At 214, method 200 includes outputting a display signal for displaying an interface element at the equivalent position within the virtual desktop.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of providing a virtual desktop, the method comprising:
   tracking a world-space pose of a human;
   establishing a virtual interaction zone with an interface-space coordinate system that tracks the human and moves relative to a fixed, world-space coordinate system; and
   transforming a position defined in the fixed, world-space coordinate system to a position defined in the moveable, interface-space coordinate system.

2. The method of claim 1, further comprising outputting a display signal for displaying an interface element at a desktop-space coordinate corresponding to the position defined in the moveable, interface-space coordinate system.

3. The method of claim 1, where transforming the position defined in the fixed, world-space coordinate system to the position defined in the moveable, interface-space coordinate system includes applying a transformation matrix to the position defined in the fixed, world-space coordinate system.

4. The method of claim 1, where transforming the position defined in the fixed, world-space coordinate system to the position defined in the moveable, interface-space coordinate system includes modeling the position in a model-space coordinate system corresponding to the fixed, world-space coordinate system and applying a transformation matrix to the position defined in the model-space coordinate system.

5. The method of claim 1, where the interface-space coordinate system is based on a desktop-space coordinate system of a virtual desktop.

6. The method of claim 1, where the virtual interaction zone is spatially defined by a cuboid.

7. The method of claim 6, where the moveable, interface-space coordinate system is a Cartesian coordinate system.

8. The method of claim 1, where the virtual interaction zone is at least partially defined by a segment of a spherical shell.

9. The method of claim 8, where the moveable, interface-space coordinate system is a polar coordinate system.

10. A method of providing a virtual desktop, the method comprising:
    tracking a world-space pose of a human in a fixed, world-space coordinate system;
    establishing a virtual interaction zone with an interface-space coordinate system;
    if a virtual-desktop-controlling portion of the human is within the virtual interaction zone, calculating a position of the virtual-desktop-controlling portion within the interface-space coordinate system; and
    if the virtual-desktop-controlling portion of the human is not within the virtual interaction zone, calculating a position of the virtual-desktop-controlling portion within the fixed, world-space coordinate system.

11. The method of claim 10, further comprising outputting a display signal for displaying an interface element at a desktop-space coordinate corresponding to the position of the virtual-desktop-controlling portion within the interface-space coordinate system.

12. The method of claim 10, where the interface-space coordinate system is based on a desktop-space coordinate system of the virtual desktop.

13. The method of claim 10, where the virtual interaction zone is spatially defined by a cuboid.

14. The method of claim 13, where the interface-space coordinate system is a Cartesian coordinate system.

15. The method of claim 10, where the virtual interaction zone is at least partially defined by a segment of a spherical shell.

16. The method of claim 15, where the interface-space coordinate system is a polar coordinate system.

17. A computing system, comprising:
a logic subsystem; and
a data-holding subsystem configured to hold instructions executable by the logic subsystem to instantiate:
  a depth image analysis module to track a world-space pose of a human;
  an interaction module to establish a virtual interaction zone with an interface-space coordinate system that tracks the human and moves relative to a fixed, world-space coordinate system;
  a transformation module to transform a position of a hand of the human as defined in the fixed, world-space coordinate system to a position defined in the moveable, interface-space coordinate system; and
  a display module for displaying an interface element at a desktop-space coordinate corresponding to the position defined in the moveable, interface-space coordinate system.

18. The computing system of claim 17, where the transformation module applies a transformation matrix to the position defined in the fixed, world-space coordinate system to transform the position defined in the fixed, world-space coordinate system to the position defined in the moveable, interface-space coordinate system.

19. The computing system of claim 17, where the transformation module applies a transformation matrix to a position defined in a model-space coordinate system that corresponds to the position defined in the fixed, world-space coordinate system.

20. The computing system of claim 17, where the interface-space coordinate system is based on a desktop-space coordinate system of a virtual desktop.

\* \* \* \* \*